UNITED STATES PATENT OFFICE.

WILLIAM F. DOERFLINGER, OF ARROCHAR, NEW YORK.

LACQUER ENAMEL.

1,345,354.

Specification of Letters Patent.   Patented July 6, 1920.

No Drawing.   Application filed February 6, 1919. Serial No. 275,328.

*To all whom it may concern:*

Be it known that I, WILLIAM F. DOERFLINGER, a citizen of the United States, residing at Arrochar, in the county of Richmond and State of New York, have invented certain new and useful Improvements in Lacquer Enamels, of which the following is a specification.

This invention relates to lacquer enamels containing a film forming substance, such as a cellulose ester dissolved in a volatile solvent. The object is to produce a lacquer enamel which will form an electrically non-conducting coating of high strength and durability and high opacity particularly to actinic light in proportion to the weight of the coating; particularly for use as a protective coloring airplane lacquer or wing dope to be used for the outer coat or coats in doping airplane wings and fabric.

It is desirable that a protective coloring airplane lacquer should dry quickly, economizing on time both when the lacquer is used in the factory or in field repairs. It is desirable that it exert a proper stretching effect when applied to airplane fabric on the frame. This permits substituting a coat or coats of protective coloring enamel for the ordinary airplane lacquer and does not necessitate the use of an extra coat in addition to the coats normally applied.

It is necessary that a protective coloring lacquer exert a high protective power in protecting the under coats of lacquer from the disintegrating effect of actinic light and the normal conditions of exposure in use, and that it be itself of high durability under these conditions. It should be easy to apply producing a smooth even surface, so as not to increase the skin friction of the plane, and the dry coating should be a non-conductor of electricity so as not to interfere with the use of wireless, etc., on the plane. It should produce a coating comparatively low in weight so as not to increase the weight of the plane unduly, and it is desirable that the coating be of a nature to permit of ready removal and patching in making repairs. It is desirable to be able to give the enamel different shades and colors for camouflage effects, etc., by the incorporation of tinting agents in relatively minor amounts. It should adhere well to underlying coats or ordinary airplane lacquer, even when the volatile solvents in the latter have not completely dried out.

I produce a protective coloring enamel lacquer having these desirable qualities by incorporating in a suitable lacquer, such as a cellulose acetate airplane lacquer, a suitable amount of stannic oxid. I find that about seven (7) ounces of stannic oxid per gallon of lacquer gives good results. As it is desirable that the outer coating of an airplane surface be highly fire resisting, I prefer to use as a base vehicle a lacquer of which the film forming substance is cellulose acetate.

I use the ordinary commercial stannic oxid—the tin oxid of the ceramic industry. This is chemically inert, stable, a non-conductor of electricity and is extremely smooth, even and finely divided and can be incorporated without grinding or grinding medium. The fact that it can be used without an oily grinding medium is particularly important in its use with cellulose acetate solutions, which are incompatible with oils. I find, that used as I have described, it possesses a remarkable light excluding power in proportion to its weight and bulk. It can be readily tinted to desired shades by incorporating along with it tinting agents, such as suitable soluble dyes or pigments which may be used in very small amount if care is taken to select agents of high tinctorial power.

As an example I produce a battleship gray protective coloring airplane lacquer enamel or wing dope, as follows:

I mix twenty pounds of tin oxid with two gallons of acetone, two gallons of diacetone alcohol, one and one half gallons of benzol and four and one fourth ounces of spirit soluble jet nigrosin previously dissolved in one and one half quarts of diacetone alcohol by tumbling one half hour or so in a tumbling barrel. I then add the solution of twenty-four pounds of cellulose acetate in twenty-four and one half gallons acetone, five gallons diacetone alcohol and twelve and one half gallons of benzol and mix thoroughly by tumbling several hours. This produces a lacquer which works well in application, and in which the tin oxid has little tendency to settle. Although containing only about seven ounces of pigment per gallon, it is remarkably efficient in protecting underlying cellulose acetate or cellulose nitrate lacquer and produces a coating which is itself very strong and durable. It dries with the normal stretching effect of a cellulose acetate wing dope and the coating is smooth and of attractive appearance. The presence of high boiling cellulose acetate solvent in cellulose acetate enamels greatly improves the working qualities of the enamel and the wearing qualities of the film resulting in use. In general I prefer to use diacetone alcohol as the high boiling solvent as in the illustrative example but other suitable high boiling cellulose acetate solvent may be used.

To produce different colors other dyes or pigments may be used in small amount in place of the nigrosin.

In coating airplane fabric (stretched on its frame) I prefer to give the fabric three coats of ordinary wing dope, which may be an acetate dope of substantially similar composition to my enamel, without the tin oxid and nigrosin and preferably with a somewhat smaller proportion of diacetone alcohol and benzol, and then one or two coats of my battleship gray enamel, allowing each coat to dry before applying the next.

For ordinary lacquer, particularly for use on rigid surfaces such as metal or wood, I may use a much larger proportion of tin oxid and it is possible to produce very beautiful and durable enamel lacquers in this way by the use of proper tinting agents. The composition can, of course, be greatly varied without departing from the spirit of my invention.

Having now described my invention, what I claim is:

1. A cellulose ester enamel lacquer comprising a cellulose ester dissolved in a volatile liquid to form a free flowing solution, and suspended stannic oxid; ester, solvent and stannic oxid being in such proportions, and solvent of such volatility as to form an enamel lacquer which can be readily applied to a supporting surface with a brush, and which when so applied will dry quickly producing a smooth even surface; substantially as described.

2. An enamal lacquer comprising cellulose acetate dissolved in a volatile solvent and suspended stannic oxid.

3. A protective coloring airplane lacquer comprising dissolved cellulose acetate, very volatile liquid in major amount, high boiling cellulose acetate solvent in minor amount, and inert light excluding agent of which stannic oxid is a constituent.

4. A protective coloring airplane lacquer comprising dissolved cellulose acetate, acetone, diacetone alcohol and stannic oxid, substantially as described.

5. A protective coloring airplane lacquer comprising dissolved cellulose acetate, acetone, diacetone alcohol, stannic oxid and dissolved nigrosin substantially as described.

6. An enamel lacquer containing sufficient suspended stannic oxid to render the dry film formed on evaporation of a layer of the lacquer enamel opaque to actinic light.

7. An airplane lacquer containing suspended stannic oxid.

WILLIAM F. DOERFLINGER.

Witnesses:
F. F. PERRY,
C. P. VAN DUZER.